(12) United States Patent
Schmidtberger et al.

(10) Patent No.: US 9,671,018 B1
(45) Date of Patent: Jun. 6, 2017

(54) GEAR SHIFT MECHANISM

(71) Applicant: Eskridge, Inc., Olathe, KS (US)

(72) Inventors: Jesse Schmidtberger, Olathe, KS (US); Jared Armstrong, Olathe, KS (US)

(73) Assignee: Eskridge, Inc., Olathe, KS (US)

( * ) Notice: Subject to any disclaimer, the term of this patent is extended or adjusted under 35 U.S.C. 154(b) by 0 days.

(21) Appl. No.: 14/969,616

(22) Filed: Dec. 15, 2015

(51) Int. Cl.
| | |
|---|---|
| F16H 3/44 | (2006.01) |
| F16H 63/32 | (2006.01) |
| F16H 3/66 | (2006.01) |
| F16H 63/04 | (2006.01) |
| F16H 63/30 | (2006.01) |
| E21B 3/02 | (2006.01) |

(52) U.S. Cl.
CPC ............... *F16H 63/32* (2013.01); *E21B 3/02* (2013.01); *F16H 3/66* (2013.01); *F16H 63/04* (2013.01); *F16H 63/304* (2013.01); *F16H 63/3023* (2013.01); *F16H 2063/3096* (2013.01); *F16H 2063/325* (2013.01); *F16H 2200/2007* (2013.01)

(58) Field of Classification Search
None
See application file for complete search history.

(56) References Cited

U.S. PATENT DOCUMENTS

| | | | | |
|---|---|---|---|---|
| 1,582,772 | A | * | 4/1926 | Moore ................ F16H 61/0293 475/282 |
| 1,745,075 | A | * | 1/1930 | Wise .................. F16H 61/0293 475/296 |
| 1,986,045 | A | * | 1/1935 | Clayton .................. F16H 3/663 475/272 |
| 2,821,089 | A | | 1/1958 | Russell |
| 4,003,274 | A | * | 1/1977 | Hirtsiefer ................ B25B 17/00 475/296 |
| 4,181,041 | A | * | 1/1980 | Frost ........................ F16H 3/72 475/300 |
| 4,955,935 | A | | 9/1990 | Katayama |
| 6,553,759 | B2 | | 4/2003 | Matsufuji |
| 6,668,676 | B2 | | 12/2003 | Koyama et al. |
| 6,892,600 | B2 | | 5/2005 | Onuma et al. |
| 7,137,311 | B1 | | 11/2006 | Neubauer et al. |
| 7,270,027 | B2 | | 9/2007 | Berger et al. |
| 7,487,696 | B2 | | 2/2009 | Tagami |
| 7,568,404 | B2 | | 8/2009 | Grossman et al. |

* cited by examiner

*Primary Examiner* — Dirk Wright
(74) *Attorney, Agent, or Firm* — Gable Gotwals

(57) ABSTRACT

An improved gear shift mechanism for an auger gear drive which uses a hydraulic cylinder or other linear force means to push on one end of a rocker arm. This moves the rocker arm and the gear train between a first gear set and a second gear set. A biasing means is applied directly to the rocker arm by a spring or other device. The design eliminates adjustable linkages and the need adjustments in the field and allows for use of a simpler hydraulic cylinder than found in the prior art.

11 Claims, 5 Drawing Sheets

GEAR SHIFT MECHANISM

FIELD OF THE INVENTION

The present invention relates generally an improved gear shift mechanism for an auger planetary gear drive. More particularly, the present invention relates to an improved gear shift which eliminates adjustable portions of the mechanism.

BACKGROUND OF THE INVENTION

Multispeed planetary gear drives are commonly used to drive large earth boring augers. These augers can be used for numerous operations. They are commonly used to dig large cylindrical holes for use in setting utility poles or piers. These same gear drives are used to drill anchors and anchor foundations into the soil.

These gear drives typically have two speeds or gear sets for rotating the auger. The first gear set is used when drilling under normal soil conditions. The second gear set is geared lower. That is to say one rotation of the drive motor output shaft provides more degrees of rotation when using the first gear set than when using the second gear set. Thus if operation of the auger in the first gear set hits soil conditions that stall out the drive motor, the gear drive can be shifted to the second gear set which provides a greater mechanical advantage for the motor.

The prior art gear shift used linkages with various length and alignment adjustments. See FIG. 1. These can be set to optimum conditions during the manufacture. All shifting forces and biasing forces are from the hydraulic cylinder. There are no external springs or biasing means on the gear shift lever itself. As the gear drive is used, these linkages wear leading to misalignment of the prior art gear shift. In extreme cases this can lead to binding and inoperability of the gear shift. These linkages can be adjusted in the field. But aligning these linkages is difficult at best, especially when done by someone who is not trained to perform this task. Further, the individual in the field would likely not have the precision measurement tools necessary to obtain a proper alignment.

What is needed, therefore, is a gear shift mechanism which does not require adjustment to the alignment.

BRIEF SUMMARY OF THE INVENTION

The present invention achieves its objections by providing an improved gear shift mechanism which uses a hydraulic cylinder or other linear force means to push on one end of a rocker arm. This moves the rocker arm and the gear train between a first gear set and a second gear set. A biasing means is applied directly to the rocker arm by a spring or other device. Thus the present invention eliminates adjustable linkages and the need of adjustments in the field.

Further, because the biasing means in the gear drive is provided by a spring acting on the rocker arm, a simpler hydraulic cylinder can be used.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 2:
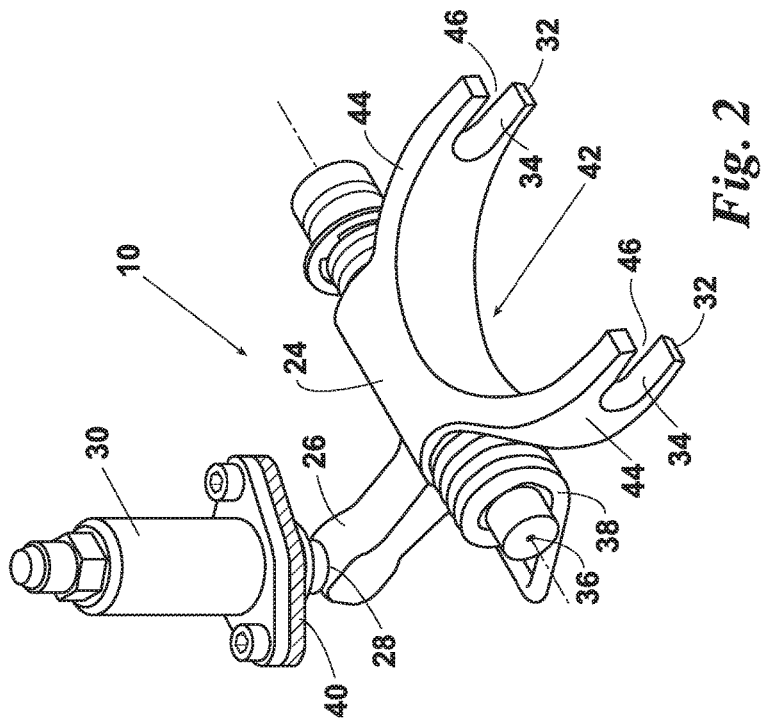
FIG. 2 is a perspective view of the preferred embodiment of the gear shift mechanism of the present invention.
Figure 1:
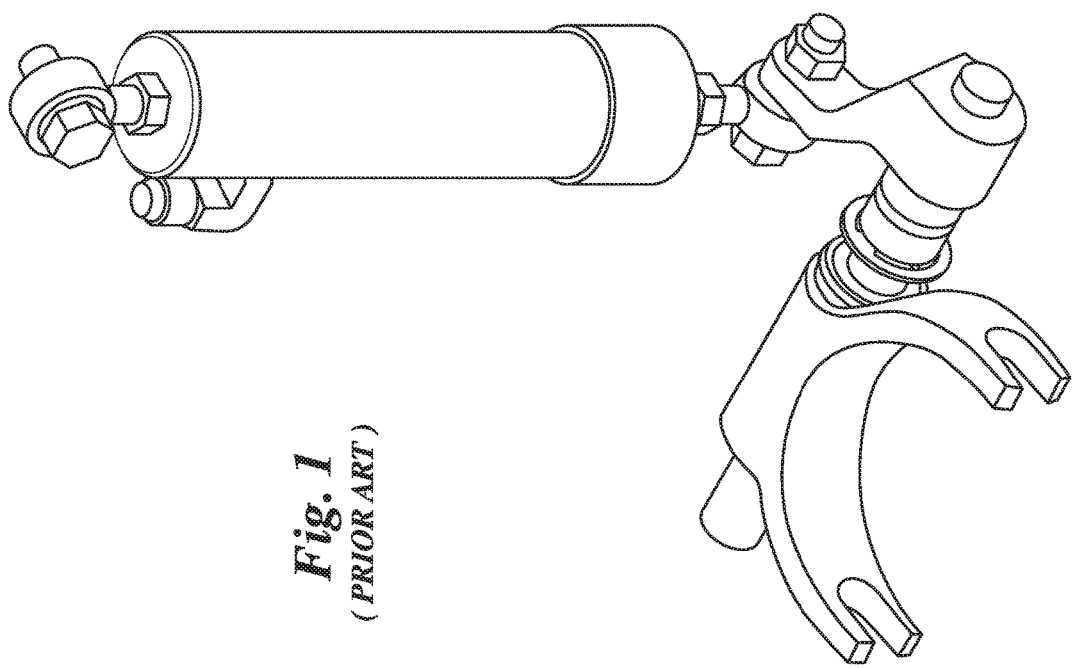
FIG. 1 is a perspective view of the prior art shift mechanism.
Figure 3:
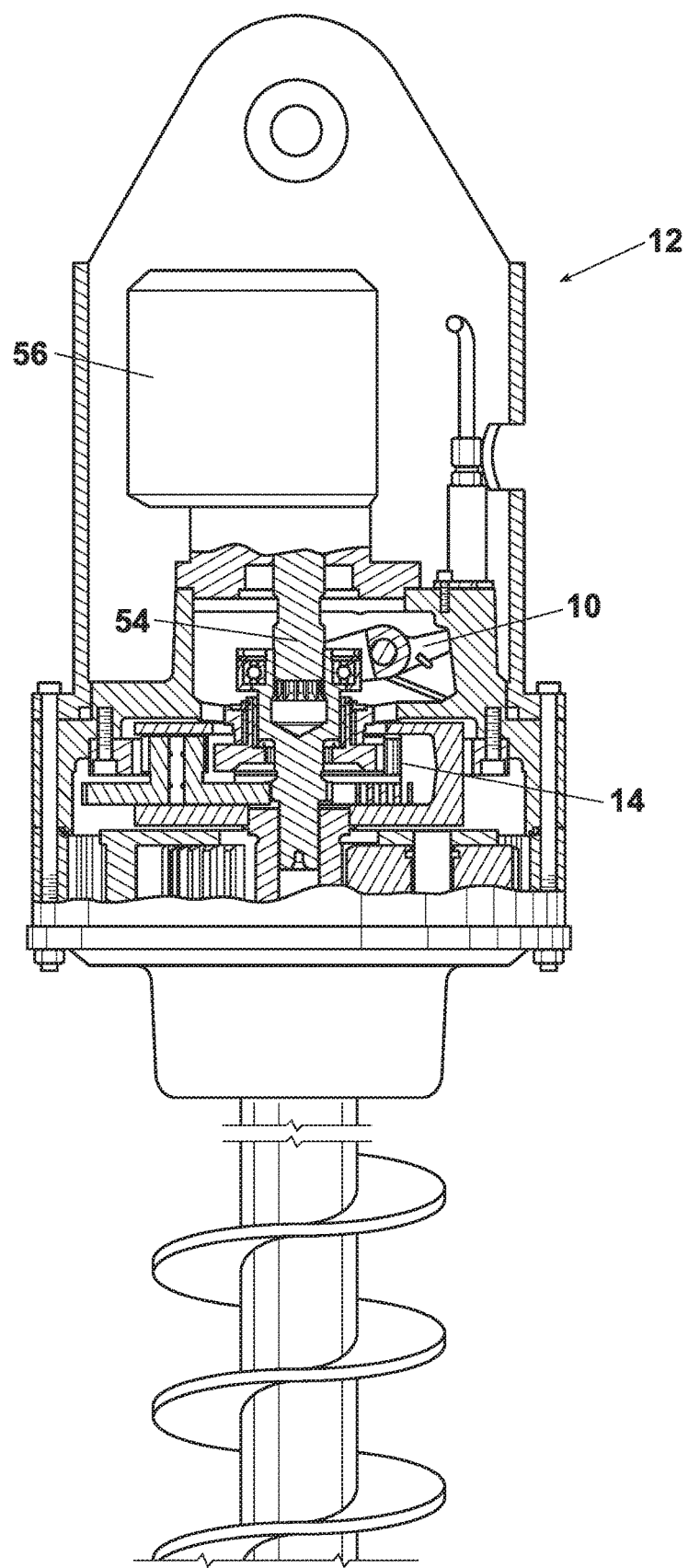
FIG. 3 is a partial sectional view showing the gear shift mechanism of the present invention on a drive train with an auger.
Figure 4:
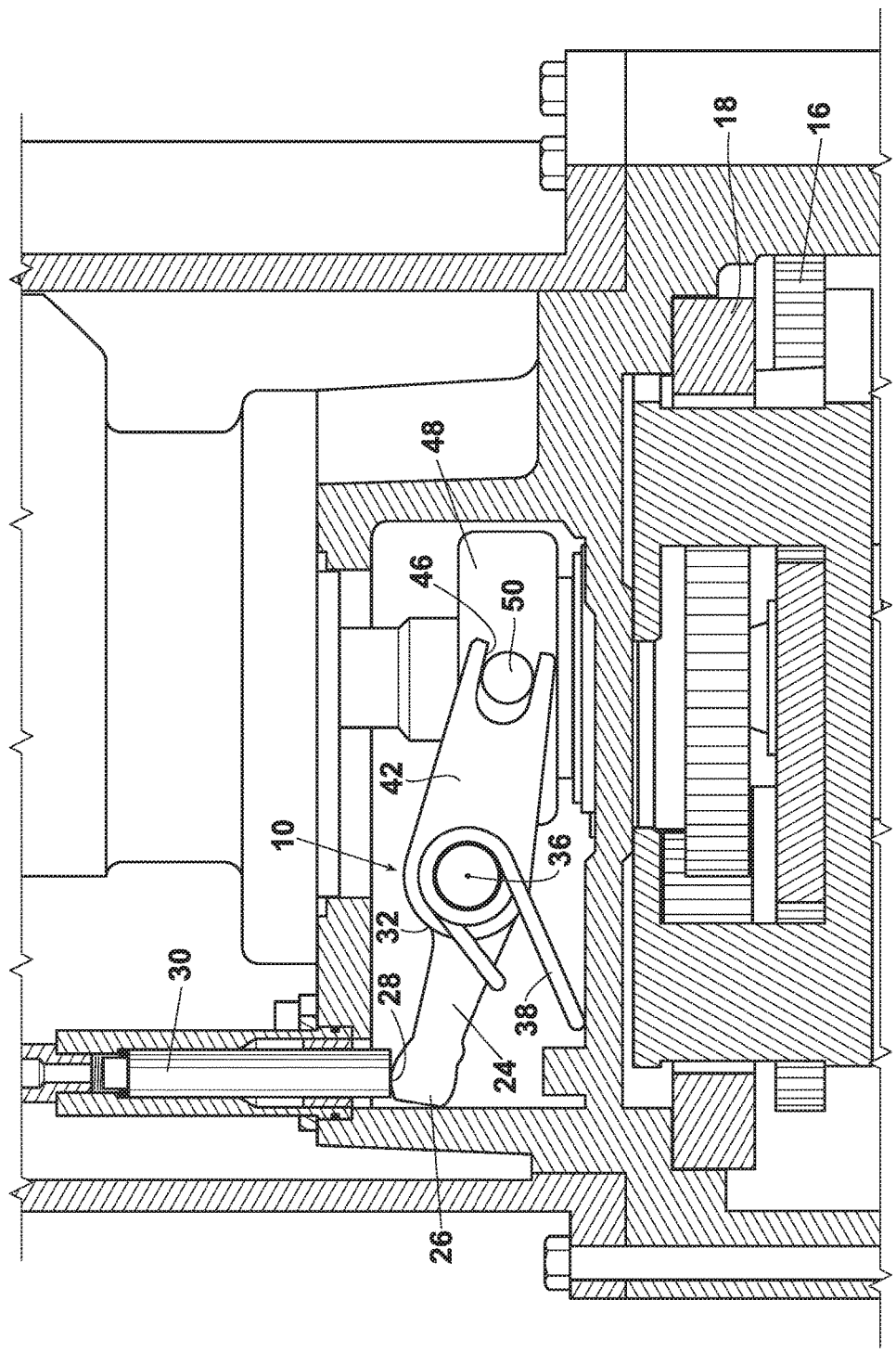
FIG. 4 is a close up of the gear shift mechanism on a planetary gear drive from the opposite side as shown in FIG. 3.
Figure 5:
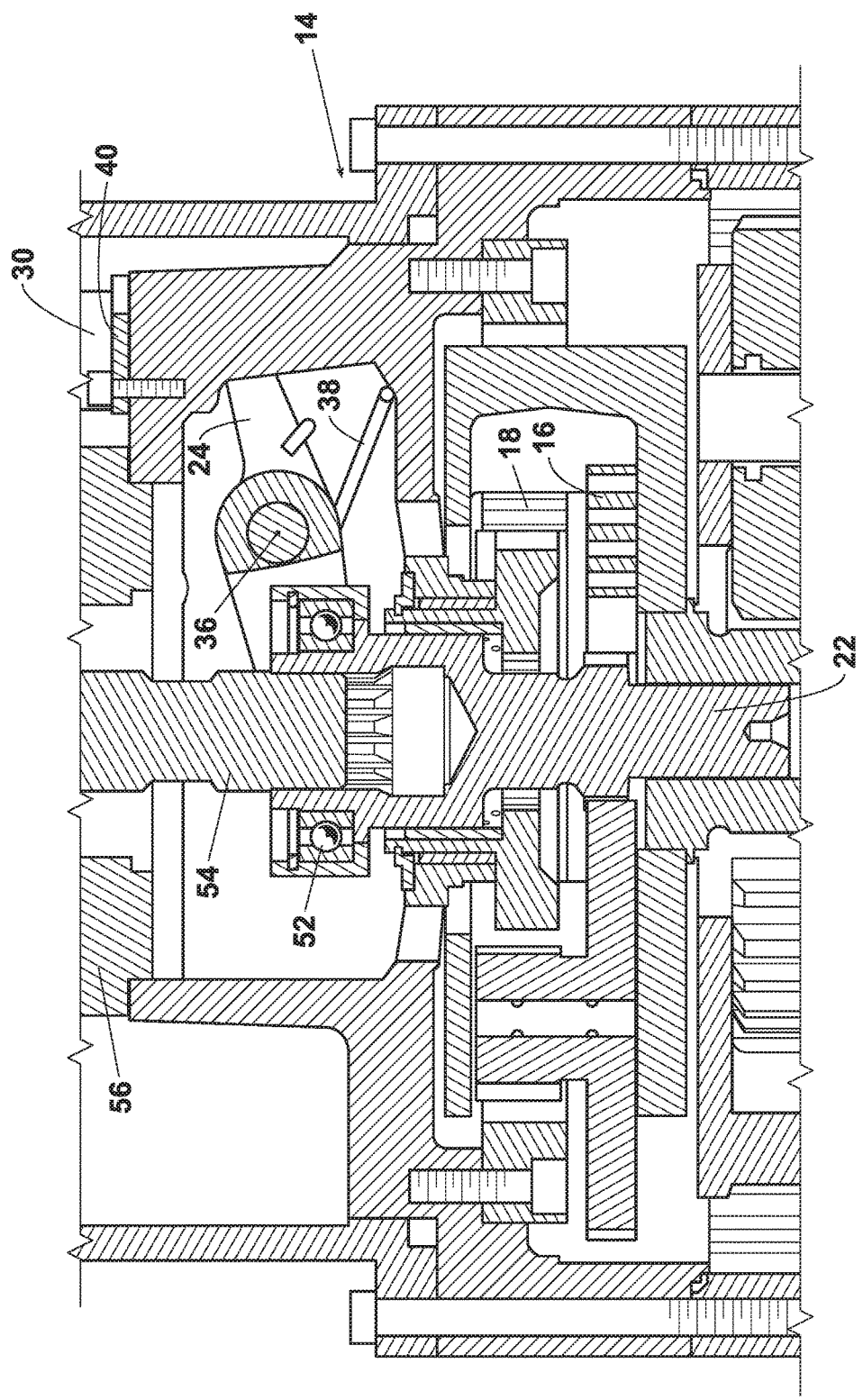
FIG. 5 is a sectional view showing the gearshift mechanism in FIG. 3 in a first position.
Figure 6:
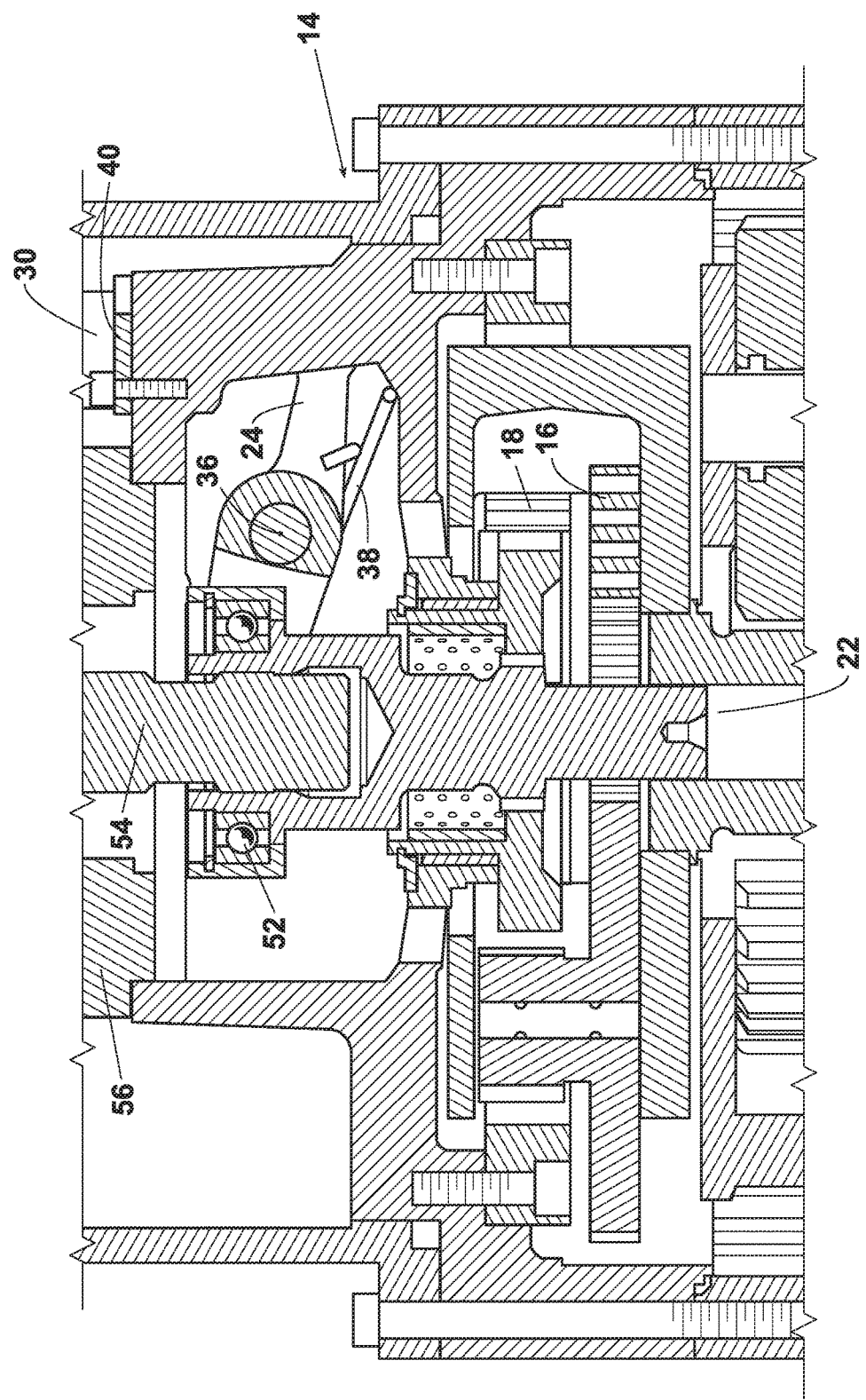
FIG. 6 is a sectional view showing the gearshift mechanism in FIG. 3 in a second position.

Turning now to the drawings wherein like reference characters indicate like or similar parts throughout, FIG. 2 illustrates a shifter mechanism 10 for an auger gear drive 12. The auger gear drive 12 has a planetary gear train 14 with a first planetary gear set 16 and a second planetary gear set 18 and an input gear 20 mounted on a drive spindle 22.

The shifter mechanism 10 has a rocker arm 24 pivotally mounted to the auger gear drive 12. The rocker arm 24 has a first end 26 with a contact point 28 for a linear force means 30, a second end 32 with a sliding means 34. A pivot point 36, providing the pivotal mount to the gear drive 12, is located between the first end 26 and second end 32. A biasing means 38 biases the rocker arm 24 into a first position about the pivot point 36. When the linear force means 30 is extended it contacts the contact point 28 on the rocker arm 24. This overcomes the force from the biasing means 38 and causes the rocker arm 24 to rotate about the pivot point 36 and move from the first position to the second position. This action also moves the input gear 20 from contact with the first gear set 16 to contact with the second gear set 18.

In the preferred embodiment the biasing means 38 is a torsion spring located at the pivot point 36. Other arrangements, such as a linear spring applying force to an end of the rocker arm 24, could also be used as the biasing means.

In the preferred embodiment the linear force means 30 is a hydraulic cylinder. Other mechanisms such as a pneumatic cylinder, solenoid or mechanical linkage could also be used. The linear force means 30 is positively mounted relative to the auger gear drive 12. That is to say the linear force means 30 can only be mounted in one position without adjustment. This assures proper alignment. This is accomplished by using a flange 40 which is complimentary to the exterior of the linear force means 30.

A yoke 42 in the preferred embodiment provides the interconnection with the drive spindle 22. The yoke 42 has a pair of opposing arms 44 which extend on either side of the drive spindle 22. There is a slot 46 in the end of each of the opposing arms 44. A bracket 48 with a pair of opposing posts 50 encircles the drive spindle 22. The posts 50 engage with the slots 46 of the yoke 42. The bracket 48 is mounted to the drive spindle 22 with a bearing 52 which allows for rotational movement between the bracket 48 and the drive spindle 22 without any linear movement along the drive spindle 22.

The drive spindle 22 is coupled to an output shaft 54 of a drive motor 56. The drive spindle 22 and output shaft 54 are coupled such that they allow linear movement between the spindle 22 and shaft 54 yet prevent rotational movement between the spindle 22 and shaft 54.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. Shifter mechanism for an auger gear drive, said shifter mechanism comprising:
   a planetary gear drive having a first planetary gear set, a second planetary gear set and an input gear mounted on a drive spindle;
   a rocker arm having a pivot point pivotally mounting the rocker arm relative to the planetary gear drive, the rocker arm being engaged with the drive spindle and moveable between a first position where the input gear is engaged with the first planetary gear set and a second position where the input gear is engaged with the second planetary gear set;
   a biasing means biasing the rocker arm and drive spindle to the first position; and
   a linear force means engaged with the rocker arm and capable of moving the rocker arm and drive spindle to the second position.

2. The shifter mechanism of claim 1, said spring means comprising a torsion spring.

3. The shifter mechanism of claim 2, said pivot point comprising:
   a pin extending from the rocker arm,
   wherein the torsion spring extends around the pin.

4. The shifter mechanism of claim 1, said linear force means comprising a hydraulic cylinder.

5. The shifter mechanism of claim 1, said linear force means comprising an electric solenoid.

6. The shifter mechanism of claim 1, said rocker mechanism comprising a contact point located on a first end, a sliding mechanism located on a second end and the pivot point located between the first end and the second end.

7. The shifter mechanism of claim 6, said sliding mechanism comprising a yoke with opposing sides, each side slidingly engaging with a bracket engaged with the spindle.

8. The shifter mechanism of claim 7 further comprising:
   a bearing located between the bracket and the spindle wherein the bearing allows for rotational movement between the bracket and the spindle.

9. The shifter mechanism of claim 8 further comprising:
   a drive motor with an output shaft and a sliding connection between the drive motor output shaft and the spindle;
   wherein the sliding connection prevents rotational movement of the spindle relative to the shaft and allows for linear movement of the spindle relative to the drive motor output shaft.

10. The shifter mechanism of claim 8 further comprising:
    a flange fixedly mounted relative to the planetary gear drive and complementary to an exterior surface of the linear force means;
    wherein the linear force means is positively mounted relative to the planetary gear drive.

11. The shifter mechanism of claim 1, said linear force means comprising a pneumatic cylinder.

* * * * *